US012353392B2

(12) United States Patent
Beier et al.

(10) Patent No.: US 12,353,392 B2
(45) Date of Patent: Jul. 8, 2025

(54) STORING A TABLE IN A DATABASE SYSTEM

(71) Applicant: INTERNATIONAL BUSINESS MACHINES CORPORATION, Armonk, NY (US)

(72) Inventors: Felix Beier, Haigerloch (DE); Knut Stolze, Hummelshain (DE); Reinhold Geiselhart, Rottenburg-Ergenzingen (DE); Luis Eduardo Oliveira Lizardo, Böblingen (DE)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 18/173,997

(22) Filed: Feb. 24, 2023

(65) Prior Publication Data

US 2024/0220474 A1    Jul. 4, 2024

(51) Int. Cl.
*G06F 16/22* (2019.01)
(52) U.S. Cl.
CPC ........ *G06F 16/2282* (2019.01); *G06F 16/221* (2019.01); *G06F 16/2219* (2019.01)
(58) Field of Classification Search
CPC .................................................. G06F 16/2282
See application file for complete search history.

(56) References Cited

U.S. PATENT DOCUMENTS

| | | | |
|---|---|---|---|
| 9,442,995 B2 | 9/2016 | Pareek | |
| 9,563,681 B1 * | 2/2017 | Patiejunas | G06F 16/27 |
| 10,585,862 B2 | 3/2020 | Pazdziora | |
| 2003/0037029 A1 * | 2/2003 | Holenstein | G06F 16/2343 |
| 2006/0075006 A1 * | 4/2006 | Yu | G06F 16/2219 |
| 2008/0114780 A1 | 5/2008 | Man | |
| 2008/0243945 A1 * | 10/2008 | Hanus | G06F 16/2219 |
| 2009/0265399 A1 * | 10/2009 | Cannon | G06F 16/1748 |
| 2013/0318044 A1 | 11/2013 | Pareek | |

(Continued)

FOREIGN PATENT DOCUMENTS

EP    1342173 A2    9/2003
WO    0148638 A3    7/2001

OTHER PUBLICATIONS

Intellectual Property Office, "Patents Act 1977: Search Report under Section 17(5)," Search Report, Jun. 22, 2023, 3 pages, GB Application No. 2300005.2.

(Continued)

*Primary Examiner* — Mohammad S Rostami
(74) *Attorney, Agent, or Firm* — CANTOR COLBURN LLP; Teddi Maranzano

(57) ABSTRACT

The present disclosure relates to a method for storing a table in a database system. The table comprises a first set of one or more columns of first data type and a second set of one or more columns of second data type. The method comprises: storing the first set of columns and a set of locator columns in a first regular table space. The second set of columns may be stored in a second large object table space. In case a first recorded data volume is higher than or equal to a second recorded data volume, data of the second large object table space may be assigned to a first large object table space. In case the first recorded data volume is smaller than the second recorded data volume, data of the first regular table space may be assigned to a second regular table space.

25 Claims, 6 Drawing Sheets

(56) References Cited

U.S. PATENT DOCUMENTS

| | | | |
|---|---|---|---|
| 2014/0359226 A1* | 12/2014 | Pan | G06F 12/0873 |
| | | | 711/135 |
| 2015/0248403 A1 | 9/2015 | Pazdziora | |
| 2017/0199925 A1* | 7/2017 | Barry | G06F 16/2365 |
| 2017/0371940 A1* | 12/2017 | Chintakayala | G06F 16/254 |
| 2018/0260456 A1 | 9/2018 | Chintakayala | |
| 2018/0373769 A1 | 12/2018 | Varadarajan | |
| 2019/0026302 A1* | 1/2019 | Thomsen | G06F 16/1727 |
| 2019/0102450 A1* | 4/2019 | Liu | G06F 16/2455 |
| 2020/0134073 A1* | 4/2020 | Konik | G06F 16/252 |
| 2021/0081421 A1* | 3/2021 | Liu | G06F 16/221 |
| 2022/0019563 A1* | 1/2022 | Devan | G06F 16/214 |
| 2022/0236897 A1* | 7/2022 | Yao | G06F 3/0604 |
| 2022/0269434 A1* | 8/2022 | Shin | G06F 3/0631 |
| 2023/0060702 A1 | 3/2023 | Oliveira Lizardo et al. | |

OTHER PUBLICATIONS

Anonymous, "Solution document: large datatype support (LOB, XML)," IBM DB2 Analytics Accelerator, Jul. 5, 2021, 12 pages, Retrieved from the Internet: <URL: https://idaawiki.dst.ibm.com/index.php/Solution_document:_large_datatype_support_(LOB,_XML)>.

Beier, et al., "Storing a Table in a Database System," Application and Drawings, Filed on Jan. 2, 2023, 42 Pages, Related GB Patent Application Serial No. GB2300005.2.

IBM, "Attaching data partitions," IBM Documentation [online], Mar. 1, 2021 [accessed on Oct. 11, 2022], 8 pages, Retrieved from the Internet: <URL: https://www.ibm.com/docs/en/db2/10.5?topic=ranges-attaching-data-partitions>.

IBM, "Using LOB locators," IBM Documentation [online], Jan. 26, 2022 [accessed on Oct. 11, 2022], 3 pages, Retrieved from the Internet: <URL: https://www.ibm.com/docs/en/db2-for-zos/11?topic=lobs-using-lob-locators>.

\* cited by examiner

STORING A TABLE IN A DATABASE SYSTEM

BACKGROUND

The present invention relates to the field of digital computer systems, and more specifically, to a method for storing a table in a database system.

Large Objects (LOBs) may be a set of data types that are designed to hold large amounts of data. For example, a LOB can hold up to a few terabytes depending on the database configuration. However, the storage of LOBs may be a challenging task.

SUMMARY

Various embodiments provide a method for storing a table in a database system, computer program product and database system as described by the subject matter of the independent claims. Advantageous embodiments are described in the dependent claims. Embodiments of the present invention can be freely combined with each other if they are not mutually exclusive.

In one aspect, the invention relates to a method for storing a table in a database system, the table comprising a first set of one or more columns and a second set of one or more columns, each column of the first set of columns being configured for comprising first type data, each column of the second set of columns being configured for comprising second type data, wherein the second type data has a maximum size higher than a maximum size of the first type data. The method comprises:
  allocating a first physical space in the database system, the first physical space comprising a first regular table space, for storing data of the first set of columns and a set of locator columns, the set of locator columns comprising values indicating locations of values of the second set of columns, wherein the set of locator columns have rows that correspond with rows of the first and second set of columns; the first physical space further comprising a first large object table space for storing the second set of columns;
  allocating a second physical space in the database system, the second physical space comprising a second regular table space, for storing the first set of columns and the locator columns and a second large object table space, for storing the second set of columns;
  storing the first set of columns and the set of locator columns in the first regular table space, resulting in a first recorded data volume;
  storing the second set of columns in the second large object table space, resulting in a second recorded data volume;
  in case the first recorded data volume is higher than or equal to the second recorded data volume:
    assigning data of the second large object table space to the first large object table space;
    deallocating the second physical space;
  in case the first recorded data volume is smaller than the second recorded data volume:
    assigning data of the first regular table space to the second regular table space;
    deallocating the first physical space.

In one aspect the invention relates to a computer program product comprising a computer-readable storage medium having computer-readable program code embodied therewith, the computer-readable program code configured to implement the method of the above embodiment.

In one aspect the invention relates to a database system for storing a table in the database system, the table comprising a first set of one or more columns and a second set of one or more columns, each column of the first set of columns being configured for comprising first type data, each column of the second set of columns being configured for comprising second type data, wherein the second type data has a maximum size higher than a maximum size of the first type data. The database system is configured for:
  allocating a first physical space in the database system, the first physical space comprising a first regular table space, for storing data of the first set of columns and a set of locator columns, the set of locator columns comprising values indicating locations of values of the second set of columns, wherein the set of locator columns have rows that correspond with rows of the first and second set of columns; the first physical space further comprising a first large object table space for storing the second set of columns;
  allocating a second physical space in the database system, the second physical space comprising a second regular table space, for storing the first set of columns and the locator columns and a second large object table space, for storing the second set of columns;
  storing the first set of columns and the set of locator columns in the first regular table space, resulting in a first recorded data volume;
  storing the second set of columns in the second large object table space, resulting in a second recorded data volume;
  in case the first recorded data volume is higher than or equal to the second recorded data volume:
    assigning data of the second large object table space to the first large object table space;
    deallocating the second physical space;
  in case the first recorded data volume is smaller than the second recorded data volume:
    assigning data of the first regular table space to the second regular table space;
    deallocating the first physical space.

BRIEF DESCRIPTION OF THE DRAWINGS

In the following embodiments of the invention are explained in greater detail, by way of example only, making reference to the drawings in which.

DETAILED DESCRIPTION

Figure 1A:
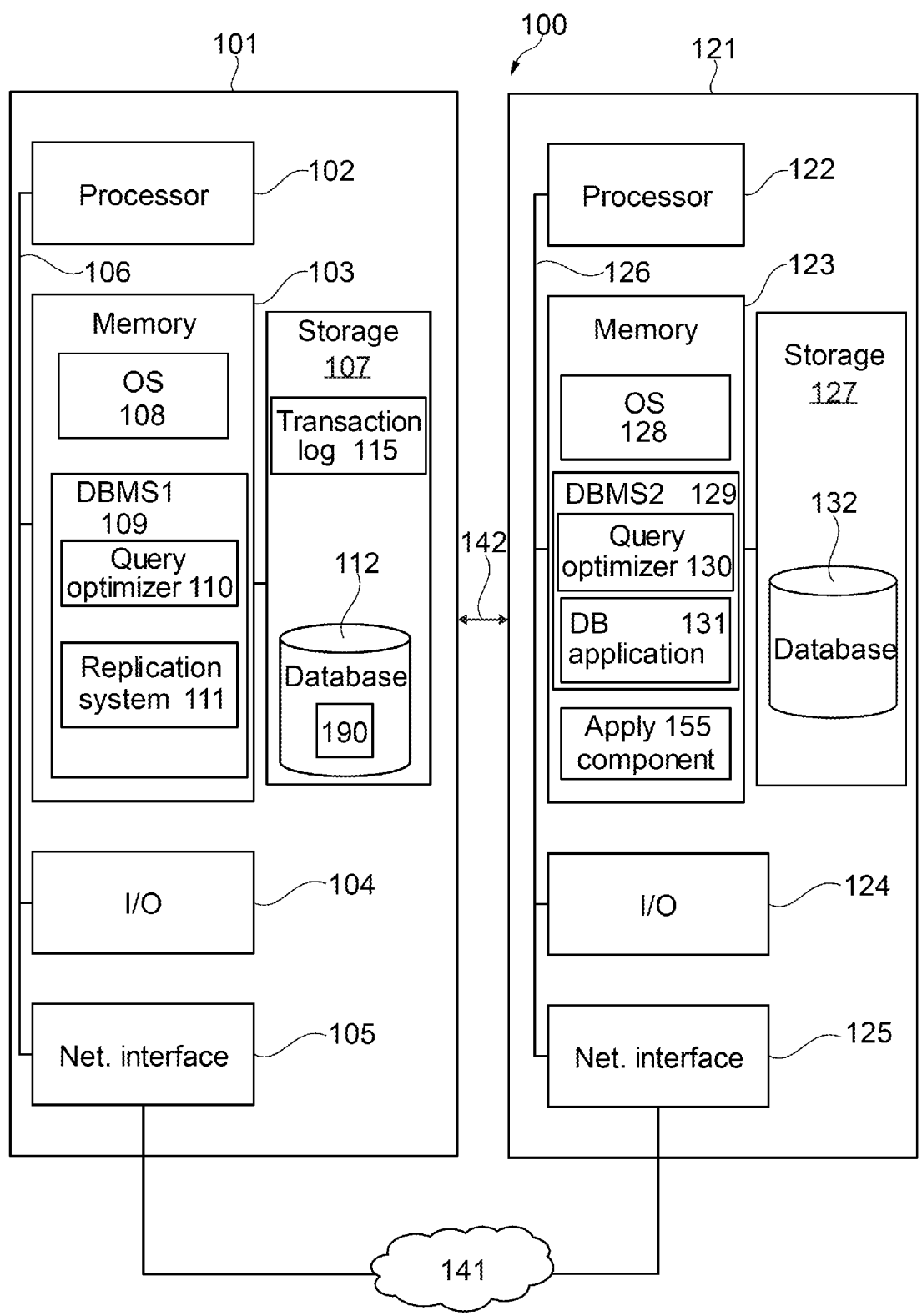
FIG. 1A illustrates a diagram of a data analysis system in accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A database system ($T_{DB}$) may be provided. The database system $T_{DB}$ may be configured to store data and enable access to the stored data. The database system $T_{DB}$ may comprise a physical space for storing the data. For example, the physical space may be provided as a table space. The table space may represent a storage location where the actual data underlying database objects of the database system may be kept. The database object which occupies physical space may be table data and indexes. The physical space may be a set of volumes on disks that hold the data.

The present subject matter may enable an efficient storage of a table ($T_0$). The table $T_0$ may comprise a first set of N1 columns and a second set of N2 columns, where N1≥1 and N2≥1. The first set of columns represent a first set of attributes respectively. The first set of attributes may be of a first data type. The first data type may comprise a regular data type such as INTEGER type, CHAR type etc. The first set of attributes may, for example, comprise an ID attribute, a name attribute, an age attribute etc. The second set of columns represent a second set of attributes respectively. The second set of attributes may be of a second data type. The second data type may comprise a large object (LOB) data type such as BLOB type, CLOB type, NCLOB type, BFILE type etc. The second set of attributes may, for example, comprise a video file, image, graphic etc. The first set of columns may thus be referred to as first set of regular columns and the second set of columns may be referred to as second set of LOB columns. The values of the first set of attributes may be referred to as regular values and the values of the second set of attributes may be referred to as LOB values. Each LOB value may be associated with a LOB locator. The LOB locator may be a reference, or a pointer, to where the LOB value is physically stored. The LOB locator may enable to access and modify a respective LOB value. The LOB locator of a LOB value may be advantageous as it may enable efficient piecewise read and write to the LOB value. Thus, the second set of N2 columns may be associated with a set of N2 locator columns respectively. Thus, the table $T_0$ may comprise rows, wherein each row has N1+N2+N2 values of the first set of N1 columns, the N2 locator columns and the second set of N2 columns respectively.

The first data type is different from the second data type. The second data type may have a maximum size higher than a maximum size of the first type data. This means that the value of each attribute of the first set of attributes may have a size smaller than the value of each attribute of the second set of attributes. For example, a LOB type can store up to 4 GB of data or more while a CHAR type may store up to e.g., to 1 GB of data; meaning that the LOB type (second data type) in this example has a maximum size of 4 GB and the CHAR type (first data type) has a maximum size of 1 GB.

The present subject matter may provide an efficient storage method for storing tables such as the table $T_0$ having these two data types. For that, a first physical (sub)space of the physical space may be allocated for storing the table $T_0$, and a second physical (sub)space of the physical space may be allocated for storing the table $T_0$. However, the present subject matter may enable to store the whole table $T_0$ either in the first physical space or in the second physical space.

For that, a first regular table space ($REG_{space}^1$) and a first LOB table space ($LOB_{space}^1$) may be allocated in the first physical space. The first set of regular columns and the set of locator columns may be stored in the first regular table space $REG_{space}^1$. This may result in the first physical space having a first recorded data volume. The database system $T_{DB}$ may record the total size of all inserted regular values and locators as the first recorded data volume.

A second regular table space ($REG_{space}^2$) and a second LOB table space ($LOB_{space}^2$) may be allocated in the second physical space. The second set of LOB columns may be stored in the second LOB table space $LOB_{space}^2$. This may result in the second physical space having a second recorded data volume. The database system $T_{DB}$ may record the total size of all inserted LOB values as the second recorded data volume.

The LOB values as well as the regular values of the first set of columns and the LOB locators may be received from a source. The source may, for example, be an external source that initially stores the table $T_0$ and that loads the table $T_0$ to the database system $T_{DB}$. Alternatively, the source may be an internal source of the database system $T_{DB}$ that stores the table $T_0$. This may, for example, be the case if the database system $T_{DB}$ uses the present method to reorganize data that is already stored in the database system $T_{DB}$ e.g., in another format.

Thus, the first physical space comprises only part of the table $T_0$ and the second physical space comprises the remaining part of the table $T_0$. However, this is just an intermediate step as the present subject matter may further decide to store the whole table $T_0$ in one of the first and second physical spaces. For example, by comparing the first recorded data volume and the second recorded data volume, it may be decided whether to store the whole table $T_0$ in the first physical space or in the second physical space.

The first recorded data volume and the second recorded data volume may be different for several reasons. For example, the number of columns N1 may be much higher than or smaller than the number of columns N2. The LOB values may have arbitrary sizes. A LOB value may be a dummy value or NULL, wherein a minimal storage is required to express this absence of a value. If there is a value, the LOB value may be any number of bytes from 0 (empty value) to a maximum size, e.g., 2 GB per value. Regular columns have sizes defined by their data type, e.g., 2 bytes for a small integer, or up to 32 kB for character columns.

In case the first recorded data volume is higher than or equal to the second recorded data volume, the data of the second LOB table space $LOB_{space}^2$ may be moved to the first LOB table space $LOB_{space}^1$. This means that the second physical space is emptied and that the first physical space contains the whole table $T_0$. The second physical space may thus be deallocated. The first recorded data volume may, for example, be higher than the second recorded data volume if the number of columns N1 is much higher than the number of columns N2. For example, the second set of LOB columns may comprise a single LOB column while the first set of columns may comprise many columns of CHAR type. Alternatively, instead of moving the data from $LOB_{space}^2$ to $LOB_{space}^1$, the second LOB table space $LOB_{space}^1$ may be swapped with the first LOB table space $LOB_{space}^1$. This may result in a new structure of the first physical space and the second physical space. For example, before swapping, the first physical space comprises the content and physical locations of $REG_{space}^1$ and $LOB_{space}^1$; however, after swapping the first physical space comprises the content and physical locations of $REG_{space}^1$ and $LOB_{space}^2$. And, before swapping, the second physical space comprises the content and physical locations of $REG_{space}^2$ and $LOB_{space}^2$; however, after swapping the second physical space comprises the content and physical locations of $REG_{space}^2$ and $LOB_{space}^1$. In this case, the locator columns of the first regular table space may be adapted to point to the correct location of the LOB values after swapping. This alternative may further save resources as the data movement may be prevented.

In case the first recorded data volume is smaller than the second recorded data volume, the data of the first regular table space $REG_{space}^1$ may be moved to the second regular table space $REG_{space}^2$. This means that the first physical space is emptied and that the second physical space contains the whole table $T_0$. The first physical space may thus be deallocated. Alternatively, instead of moving the data from $REG_{space}^1$ to $REG_{space}^2$, the first regular table space $REG_{space}^1$ may be swapped with the second regular table space $REG_{space}^2$. This may result in a new structure of the first physical space and the second physical space. For example, before swapping, the first physical space comprises the content and physical locations of $REG_{space}^1$ and $LOB_{space}^1$; however, after swapping the first physical space comprises the content and physical locations of $REG_{space}^2$ and $LOB_{space}^1$. And, before swapping, the second physical space comprises the content and physical locations of $REG_{space}^2$ and $LOB_{space}^2$; however, after swapping the second physical space comprises the content and physical locations of $REG_{space}^1$ and $LOB_{space}^2$.

Hence, the present subject matter may provide an efficient storage of the table $T_0$ because it may reduce the data movement to a minimum. The method may prevent additional data movement steps by analysing the loaded data stream and minimizing the data movement operations on the database system $T_{DB}$. This may address the data movement overheads on the database system $T_{DB}$. The present subject matter may leverage just a single database engine for managing the LOB data values. Further, it may optimize the loading process by a temporary (LOB) data buffering and efficient merge strategies to eliminate additional tables and references.

In one example, the database system $T_{DB}$ is a target database system of a data analysis system. The data analysis system comprises a source database system ($S_{DB}$). The table $T_0$ is a source table of the source database system $S_{DB}$. The data analysis system may, for example, be a data warehousing system or master data management system. The data analysis system may enable data warehousing or master data management or another technique that uses source and target database systems, wherein the target database system comprises a target database that is configured to receive/comprise a copy of a content of a corresponding source database of the source database system. The source database system $S_{DB}$ may, for example, be a transactional engine and the target database system $T_{DB}$ may be an analytical engine. For example, the source database system $S_{DB}$ may be an online transaction processing (OLTP) system and the target database system $T_{DB}$ may be an online analytical processing (OLAP) system. The source database system $S_{DB}$ may comprise a source dataset and the target database system $T_{DB}$ may comprise a target dataset. The source dataset may be part of a source database and the target dataset may be part of a target database. The source dataset may comprise tables, referred to as source tables, and the target dataset may comprise corresponding target tables. The content of the source dataset may be changed by one or more database transactions. The data analysis system may be configured to synchronize the content of the source tables of the source database system with the corresponding target tables of the target database system. For example, the present method may be performed for synchronization of data in the source database system $S_{DB}$ with data in the target database system $T_{DB}$. For that, the target database system $T_{DB}$ may perform the present method in response to receiving a load request for loading the table $T_0$ in the target database system. The table $T_0$ may, for example, a newly inserted table in the source database system $S_{DB}$ that needs to be copied into the target database system $T_{DB}$ for enabling the synchronization. This may enable to have the same data (of the table $T_0$) present in the source database system $S_{DB}$ and the target database system $T_{DB}$.

In one example, the storage of the first set of regular columns in the first regular table space $REG_{space}^1$ further comprises the storage in the first LOB table space $LOB_{space}^1$ of LOB values as dummy values or NULLs. Dummy values or NULLs may be used as placeholder for the respective missing column values.

In one example, storing the second set of LOB columns in the second large object table space $LOB_{space}^2$ space further comprises the storage in the second regular table space $REG_{space}^2$ regular values of the first set of regular columns as dummy values or NULLs and the storage in the second regular table space $REG_{space}^2$ of values of the set of locator columns as dummy values or NULLs.

In one example, the storage of the first set of regular columns and the set of locator columns and storage of the second set of LOB columns are performed concurrently. This may save processing time as the loading of the table $T_0$ may be faster.

In one example, the method further comprises determining the first recorded data volume while the data is being stored in the first physical space. For example, while loading the first set of columns of the table $T_0$ and the locator columns from the source, the totally transferred data volume may be recorded. This may save processing time as the storage of the table $T_0$ may be faster.

In one example, the method further comprises determining the second recorded data volume while the data is being stored in the second physical space. For example, while loading the LOB columns of the table $T_0$ from the source, the totally transferred data volume may be recorded. This may save processing time as the storage of the table $T_0$ may be faster.

In one example, the physical space of the database system $T_{DB}$ comprises multiple storage nodes provided as storage spaces, wherein the moving of the data is performed such that each entire row (the entire row has N1+N2+N2 values) of the table $T_0$ is stored in a same node of the database system $T_{DB}$. This may enable an efficient access to data of the table $T_0$ because all attributes of single entity can be read from a single node. This may optimize the data movement by keeping data copy operations between the first physical space and the second physical space node-local.

In one example, the method further comprises using a same distribution key for performing the moving of the data of the second LOB table space $LOB_{space}^2$ and the moving of the data of the first regular table space $REG_{space}^1$. The distribution key comprises one or more columns of the first set of regular columns.

In one example, the method further comprises: selecting a distribution key from the source table before storing the second set of LOB columns, and using the distribution key for performing the moving of the data of the second LOB table space $LOB_{space}^2$ and the moving of the data of the first regular table space $REG_{space}^1$. The distribution key comprises one or more columns of the first set of regular columns.

In one example, the source database system $S_{DB}$ comprises a source regular table space for storing the first set of columns and the set of locator columns and a source large object table space for storing the second set of columns. The storing of the second set of LOB columns at the target database system $T_{DB}$ comprises: performing a SELECT statement for selecting all locators in the source regular table space and performing a SELECT statement for selecting all corresponding LOB values of the selected LOB locators, and performing an INSERT statement for storing the selected LOB values. This may enable an efficient loading of the LOB columns of the table $T_0$ in the target database system $T_{DB}$ using existing tools.

In one example, the moving of the data of the second LOB table space $LOB_{space}^2$ to the first LOB table space $LOB_{space}^1$ and the moving of the data of the first regular table space $REG_{space}^1$ to the second regular table space $REG_{space}^2$ is performed using a bulk load operation. This may particularly be advantageous when inserting a large quantity of data from one space to the other space. This may provide an optimized time-saving approach.

In one example, the table $T_0$ is a partition of a larger table. The present method may, for example, be applicable to full table loads, which are done by a data analysis system such as IBM Db2 Analytics Accelerator for z/OS (IDAA) for initially populating the target database with to-be-accelerated table data and for synchronizing large-volume data changes on the source database with the accelerator. However, for more fine-granular updates, the data analysis system (e.g., IDAA) may also support loading of table partitions, e.g., subsets of a table's rows that are partitioned according to a specific criterion, such as assigning artificial partition IDs to rows, partitioning by value of specific columns, etc. For partial reloads that only refresh a subset of all table partitions, the present method may be also applicable. For example, to be loaded table partitions may be loaded into separate target tables using the present method (which may be referred to as data gravity-based method) as described for a full table (re-)load. The resulting target table(s) can be merged into the final target table by using the ALTER TABLE ATTACH PARTITION feature.

FIG. 1A is a block diagram for a data analysis system in accordance with an example of the present subject matter. The data analysis system 100 may, for example, comprise IBM Db2 Analytics Accelerator for z/OS (IDAA). The data analysis system 100 comprises a source database system 101 connected to a target database system 121. The source database system 101 may, for example, comprise IBM Db2 for z/OS. The target database system 121 may, for example, comprise IBM Db2 Warehouse (Db2 LUW).

Source database system 101 includes processor 102, memory 103, I/O circuitry 104 and network interface 105 coupled together by bus 106.

Processor 102 may represent one or more processors (e.g., microprocessors). The memory 103 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 103 can have a distributed architecture, where various components are situated remote from one another, but can be accessed by the processor 102.

Figure 1B:
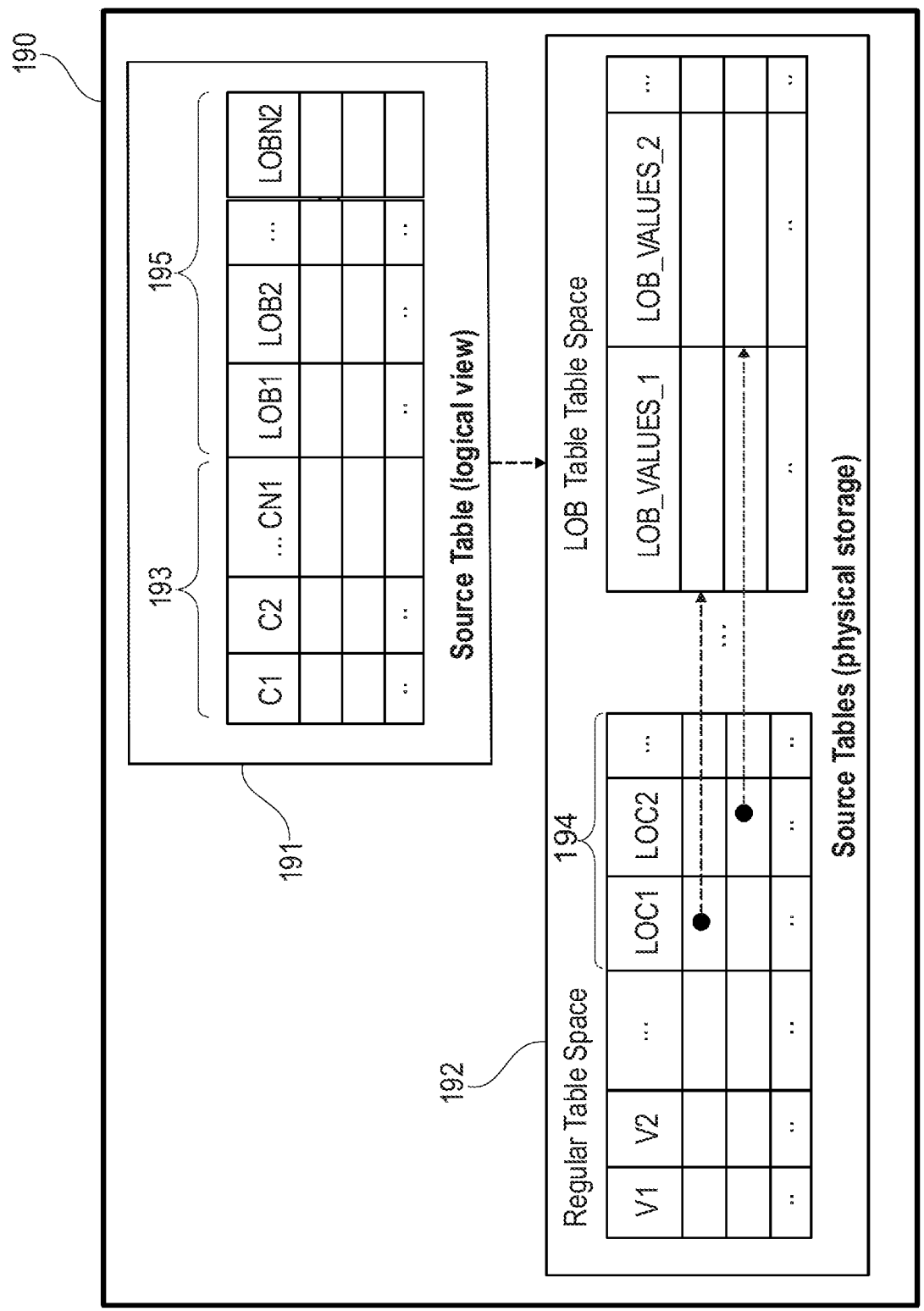
FIG. 1B depict a data layout of a source table in accordance with an example of the present subject matter.

Memory 103 in combination with persistent storage device 107 may be used for local data and instruction storage. Storage device 107 includes one or more persistent storage devices and media controlled by I/O circuitry 104. Storage device 107 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like. The storage 107 may comprise a first database 112. The first database 112 may, for example, comprise one or more first tables 190. FIG. 1B shows an example source table of the tables 190 as stored in the Source database system 101.

Memory 103 may include one or more separate programs e.g., database management system DBMS1 109, each of which comprises an ordered listing of executable instructions for implementing logical functions, notably functions involved in embodiments of this invention. The software in memory 103 shall also typically include a suitable operating system (OS) 108. The OS 108 essentially controls the execution of other computer programs for implementing at least part of methods as described herein. DBMS1 109 comprises a replication system 111 and a query optimizer 110. The replication system 111 may comprise a log reader (not shown). The log reader may read log records (also referred to as log entries) of a transaction recovery log 115 of the source database system 101 and provide changed records to the target database system 121. The transaction recovery log 115 may be referred to as primary source transaction log. The usual content of a log record may comprise a timestamp, log record sequence number (LRSN) and attribute changes. More specifically, the log records in the transaction recovery log 115 may, for example, contain information defining (1) the table being changed, (2) the value of the key column in the row being changed, (3) the old and new values of all columns of the changed row, and (4) the transaction (unit of work) causing the change. By definition, an insert is a new data record and therefore has no old values. For delete changes, there is by definition no new data record, only an old data record. Thus, log records for inserted rows may contain only new column values while transaction log records for deleted rows may contain only old column values. Log records for updated rows may contain the new and old values of all row columns. The order of log records in the primary source transaction log 115 may reflect the order of change operations of the transactions and the order of transaction commit records may reflect the order in which transactions are completed. The type of row operations in log records can, for example, be delete, insert, or update. The log reader may read log records from the recovery log, extract relevant modification, or change information (inserts/updates/deletes targeting tables in replication). Extracted information may be transmitted (e.g., as a request for application of the change) to target database system 121. The query optimizer 110 may be configured for generating or defining query plans for executing queries e.g., on first database 112.

Target database system 121 includes processor 122, memory 123, I/O circuitry 124 and network interface 125 coupled together by bus 126.

Processor 122 may represent one or more processors (e.g., microprocessors). The memory 123 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 123 can have a distributed architecture, where various components are situated remote from one another, but can be accessed by the processor 122.

Memory 123 in combination with persistent storage device 127 may be used for local data and instruction storage. Storage device 127 includes one or more persistent storage devices and media controlled by I/O circuitry 124. Storage device 127 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

Memory 123 may include one or more separate programs e.g., database management system DBMS2 129 and apply component 155, each of which comprises an ordered listing of executable instructions for implementing logical functions, notably functions involved in embodiments of this invention. The software in memory 123 shall also typically include a suitable OS 128. The OS 128 essentially controls the execution of other computer programs for implementing at least part of methods as described herein. DBMS2 129 comprises a DB application 131 and a query optimizer 130. The DB application 131 may be configured for processing data stored in storage device 127. The query optimizer 130 may be configured for generating or defining query plans for executing queries e.g., on a second database 132. The apply component 155 may apply received changes to the second database 132. The apply component 155 may buffer log records sent from the log reader and consolidate the changes into batches to improve efficiency when applying the modifications to the second database 132 via a bulk-load interface. This may enable to perform replication.

Source database system 101 and target database system 121 may be independent computer hardware platforms communicating through a high-speed connection 142 or a network 141 via network interfaces 105, 125. The network 141 may, for example, comprise a local area network (LAN), a general wide area network (WAN), and/or a public network (e.g., the Internet). Each of the source and target database systems 101 and 121 may be responsible for managing its own copies of the data.

Although shown in FIG. 1A as separate systems, the source and target database systems may belong to a single system e.g., sharing a same memory and processor hardware, while each of the source and target database systems is associated with a respective DBMS and datasets e.g., the two DBMSs may be stored in the shared memory. In another example, the two database management systems DBMS1 and DBMS2 may form part of a single DBMS that enables communications and method performed by DBMS1 and DBMS2 as described herein. The first and second datasets may be stored on a same storage or on separate storages.

FIG. 1B depicts a diagram illustrating a source table 190 as stored in the source database system 101. FIG. 1B shows a logical view 191 of the source table 190 and a physical representation 192 of the source table 190. The source table 190 comprises a first set of columns 193 referred to as regular columns. The source table 190 further comprises a second set of columns 195 referred to as LOB columns. The source table 190 is stored in the physical space of the source database system 101 as shown in FIG. 1B. Specifically, the first set of columns 193 in association with locator columns 194 are stored in a regular table space of the physical space. In addition, the second set of columns 195 are stored in a LOB table space. As indicated in FIG. 1B, each value of each locator column is referencing a corresponding LOB value in the stored LOB columns 195.

Figure 2:
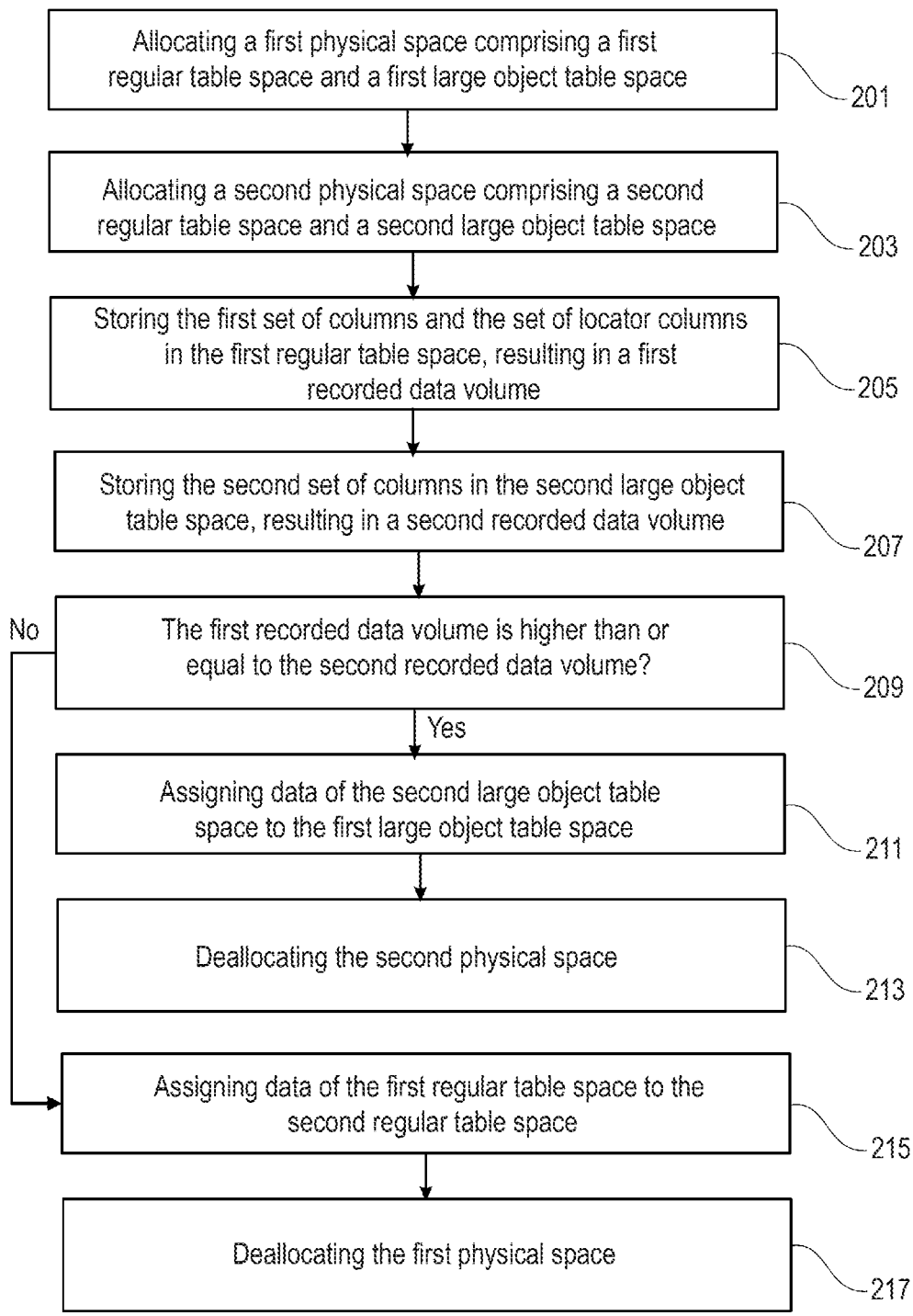
FIG. 2 is a flowchart of a method for storing a table in accordance with an example of the present subject matter.

FIG. 2 is a flowchart of a method for storing a table in a database system in accordance with an example of the present subject matter. For the purpose of explanation, the method described in FIG. 2 may be implemented in the system illustrated in FIG. 1A-B, but is not limited to this implementation. For example, the method of FIG. 2 may be performed by the target database system 121 for storing the table 190 shown in FIG. 1B.

A first physical space may be allocated in the database system 121 in step 201. The first physical space comprises a first regular table space and a first large object table space. The first regular table space may be used for storing the first set of columns 193 and the set of locator columns 194. The first large object table space may be used for storing the second set of columns 195. The first regular table space may comprise allocated spaces for receiving the respective values of the first set of columns 193 and the locator columns 194. The first large object table space may comprise allocated spaces for receiving the respective values of the second set of columns 195.

A second physical space may be allocated in the database system 121 in step 203. The second physical space comprises a second regular table space and a second large object table space. The second regular table space may be used for storing the first set of columns 193 and the locator columns 194 and the second large object table space may be used for storing the second set of columns 195. The second regular table space may comprise allocated spaces for receiving the respective values of the first set of columns 193 and the locator columns 194. The second large object table space may comprise allocated spaces for receiving the respective values of the second set of columns 195.

The first set of columns 193 and the set of locator columns 194 may be stored in step 205 in the first regular table space. This may be performed by loading the values of the first set of columns 193 and the set of locator columns 194 from a source such as the source database system 101. This may result in a first recorded data volume in the first physical space.

The second set of columns 195 may be stored in step 207 in the second large object table space. This may be performed by loading the values of the second set of columns 195 from a source such as the source database system 101. This may result in a second recorded data volume in the second physical space.

The first recorded data volume may be compared with the second recorded data volume. In case (inquiry step 209) the first recorded data volume is higher than or equal to the second recorded data volume, steps 211 to 213 may be performed; otherwise, steps 215 to 217 may be performed.

Data of the second large object table space may be assigned in step 211 to the first large object table space. The assignment may, for example, be performed by moving data of the second large object table space to the first large object table space. Alternatively, the assignment may be performed by swapping the second large object table space with the first large object table space. After swapping, the structure of the first physical space and the second physical space may change. For example, the resulting first physical space may comprise the first regular table space as defined before swapping and the second LOB table space as defined before swapping. And the resulting second physical space may comprise the second regular table space as defined before swapping and the first LOB table space as defined before swapping.

The second physical space may be deallocated in step 213. The deallocation of the second physical space may, for example, comprise deleting all values stored in the second physical space. If the swapping is applied, the deallocated second physical space is the new second physical space that resulted after the swapping.

In case the first recorded data volume is smaller than the second recorded data volume, data of the first regular table space may be assigned in step 215 to the second regular table space. The assignment may, for example, be performed by moving data of the first regular table space to the second regular table space. Alternatively, the assignment may be performed by swapping the first regular table space with the second regular table space. After swapping, the structure of the first physical space and the second physical space may change. For example, the resulting first physical space may comprise the second regular table space as defined before swapping and the first LOB table space as defined before swapping. And the resulting second physical space may comprise the first regular table space as defined before swapping and the second LOB table space as defined before swapping.

The first physical space may be deallocated in step 217. The deallocation of the first physical space may, for example, comprise deleting all values stored in the first physical space. If the swapping is applied, the deallocated first physical space is the new first physical space that resulted after the swapping.

Figure 3A:
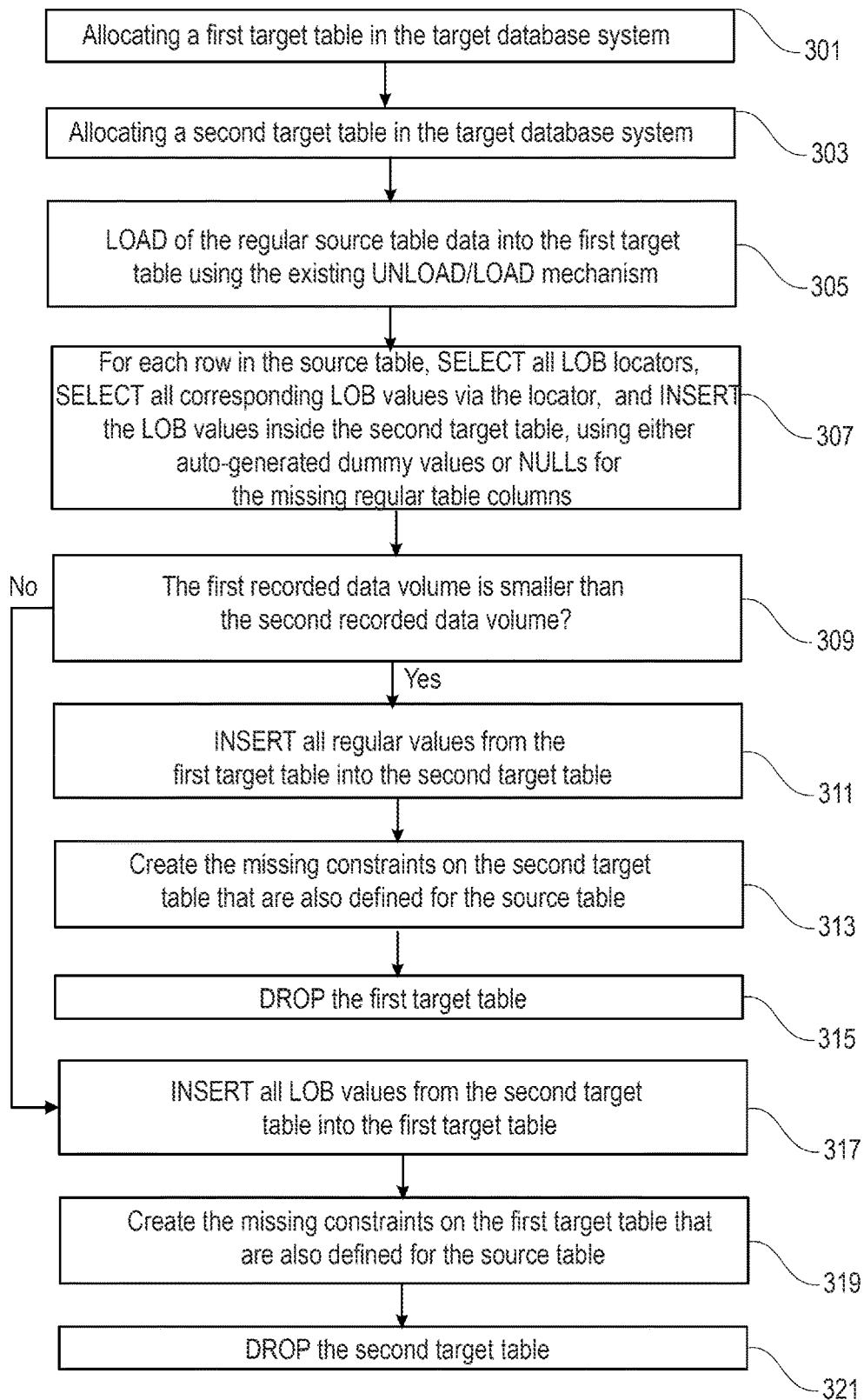
FIG. 3A is a flowchart of a method for storing a table in accordance with an example of the present subject matter.
Figure 3B:
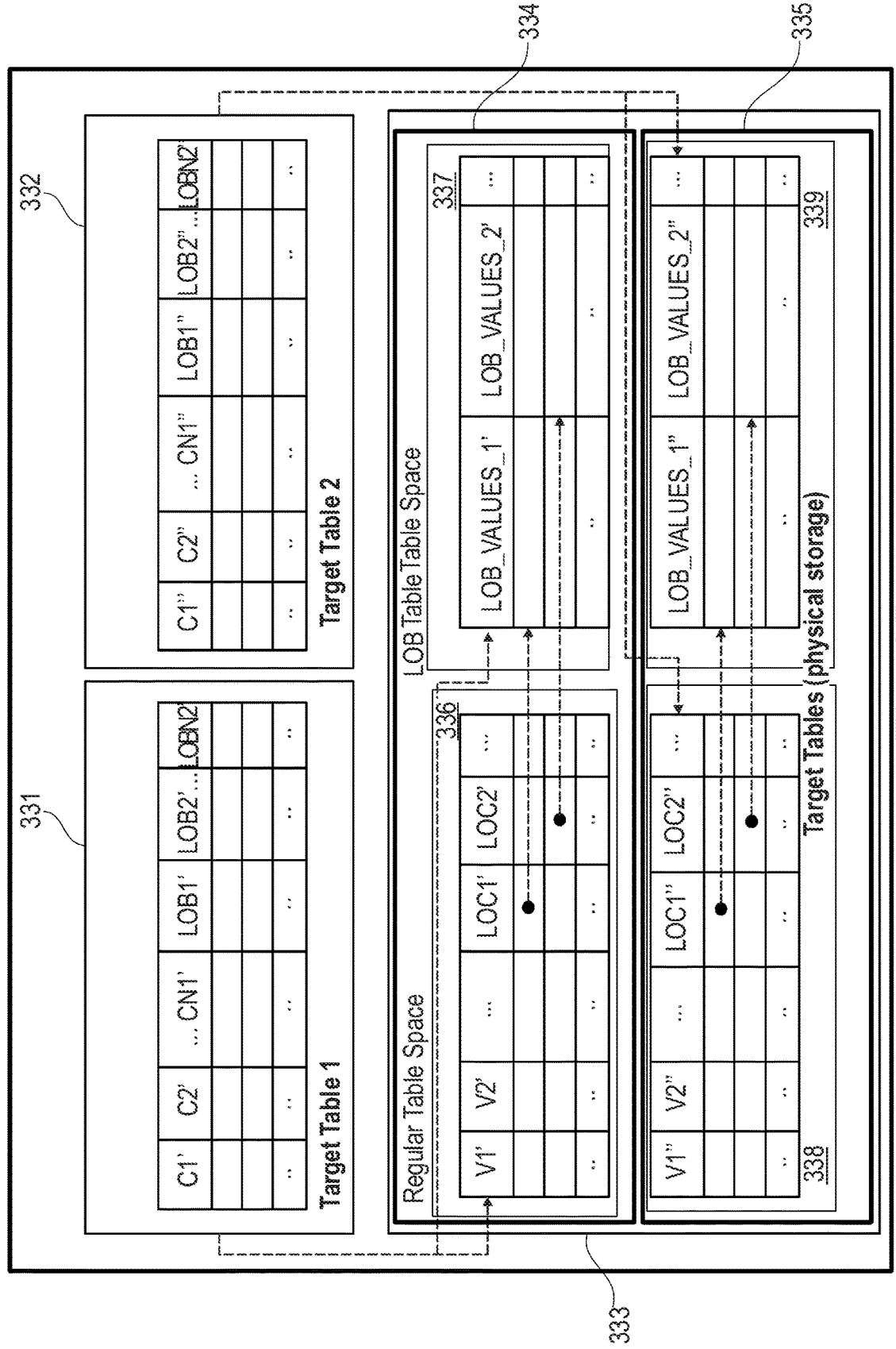
FIG. 3B depict a data layout of a target table in accordance with an example of the present subject matter.

FIG. 3A is a flowchart of a method for storing a table in a database system in accordance with an example of the present subject matter. FIG. 3A may be described with reference to the data layout shown in FIG. 3B. FIG. 3B shows the data layout for a storage in the target database system of a source table such as the source table 190 shown in FIG. 1B.

A first target table may be created in step 301 in the target database system using the same schema as the source table (e.g., shown in FIG. 1B) but omit all constraints. The constraints may be default checks (e.g., based on rules) that are performed by database systems such as the target database system to check the tables. Omitting these constraints may be performed by switching off these checks. This is because the table may have already passed successfully these checks at the source database system.

A second target table may be created in step 303 in the target database system using the same schema as the source table but omit all constraints. This is indicated in FIG. 3B where the logical representation 331 of the first target table and the logical representation 332 of the second target table are shown. The first target table 331 comprises a first set of N1 regular columns referred to as C1', C2', . . . CN1' and a second set of N2 LOB columns referred to as LOB1', LOB2', . . . LOBN2'. The locator columns associated with the LOB columns LOB1', LOB2', . . . LOBN2' may be referred to as LOC1', LOC2', . . . LOCN2' respectively. The second target table 332 comprises a first set of N1 regular columns referred to as C1", C2", . . . CN1" and a second set of N2 LOB columns referred to as LOB1", LOB2", LOBN2". The locator columns associated with the LOB columns LOB1", LOB2", LOBN2" may be referred to as LOC1", LOC2", . . . LOCN2" respectively.

Spaces may be allocated in the physical space 333 of the target database system in order to store the source table according to the present subject matter. For that, a first physical space 334 may be allocated in the physical space 333 and a second physical space 335 may be allocated in the physical space 333. The first physical space 334 comprises an allocated first regular table space 336 and a first LOB table space 337, for receiving values of the table 331. The second physical space 335 comprises an allocated second regular table space 338 and a second LOB table space 339 for receiving values of the table 332. The first physical space 334 may thus represent the first target table 331 and the second physical space 335 may thus represent the second target table 332. For example, the target database system may be configured to perform swapping of spaces. For example, if the second LOB table space 339 is swapped with the first LOB table space 337, this results in the first physical space 334 comprising the content and the physical locations of the first regular table space 336 and the second LOB table space 339 and the second physical space 335 comprises the content and the physical locations of the second regular space 338 and the first LOB table space 337. If the second regular table space 338 is swapped with the first regular table space 336, this results in the first physical space 334 comprising the content and the physical locations of the second regular table space 338 and the first LOB table space 337 and the second physical space 335 comprises the content and physical locations of the first regular space 336 and the second LOB table space 339.

A LOAD of the regular source table data into the first target table using the existing UNLOAD/LOAD mechanism may be performed in step 305. This is performed by storing values of the first set of N1 regular columns C1', C2', . . . CN1' and the locator columns LOC1', LOC2', . . . LOCN2' in the corresponding allocations in the first regular table space 336. However, this only stores part of the table 331 and LOB values are missing. Thus, in addition, the missing LOB values are filled in step 305 with NULLs in the first LOB table space 337. And while loading the table, the totally transferred first data volume may be recorded.

In step 307, for each row in the source table 190, a SELECT of all LOB locators may be performed, followed by a SELECT of all corresponding LOB values via the locator, and followed by an INSERT of the LOB values inside the second target table, using either auto-generated dummy values or NULLs for the missing regular table columns. This may enable to store the LOB values of the source table into corresponding allocations in the second LOB table space 339 and to store the NULLs, or dummy values in corresponding allocations in the second regular table space 338. And the total size of all inserted LOB values may be recorded in step 307 as second data volume.

If (inquiry step 309) the first recorded data volume is smaller than the second recorded data volume, an INSERT of all regular values from the first target table into the second target table may be performed in step 311. In other words, the values stored in the first regular table space 336 are moved in step 311 to corresponding allocations in the second regular table space 338. This step 311 may, for example, be followed by a creation in step 313 of the missing constraints on the second target table that are also defined for the source table 190. And a DROP of the first target table may be performed in step 315. That is, the values stored in the first physical space may be deleted. This may for example be performed by deallocating the first physical space 334. This may be advantageous as the second physical space 335 has now all the values of the source table 190. Steps 311 to 315 may in combination be referred to as first merging step. Alternatively, instead of moving data, the first regular table space 336 may be swapped with the second regular table space 338. This may result in a new structure of the first physical space and the second physical space.

If (inquiry step 309) the first recorded data volume is larger than or equal to the second recorded data volume, an INSERT of all LOB values from the second target table into the first target table may be performed in step 317. In other words, the values stored in the second LOB table space 339 are moved in step 317 to corresponding allocations in the first LOB table space 337. This step 317 may be followed by a creation in step 319 of the missing constraints on the first target table that are also defined for the source table 190. And a DROP of the second target table may be performed in step 321. That is, the values stored in the second physical space may be deleted. This may for example be performed by deallocating the second physical space 335. This may be advantageous as the first physical space 334 has now all the values of the source table 190. Steps 317 to 321 may in combination be referred to as second merging step. SELECT, DROP, LOAD, UNLOAD and INSERT may be SQL operators. Alternatively, instead of moving data, the second LOB table space 339 may be swapped with the first LOB table space 337. This may result in a new structure of the first physical space and the second physical space. In this case, the locators may be adapted to point to the right locations of the LOB values after swapping.

Thus, the method maintains two tables that are filled concurrently by overlapping steps 305 and 307. Both tables use the same schema as the source table 190 but are only filled with either the regular or the LOB data parts, using dummy values or NULLs as placeholder for the respective missing column values. These placeholders are filled in the merging steps, using the larger table part as merge target. The larger part can be easily determined while the data is copied in steps 305 and 307 by observing the transferred data stream. Apart from resolving the indirection via locators, the method may not assume any special features regarding LOB values on the target database. In alternative examples of the method, the merge may be implemented by moving LOB locator values from between the target tables. But this may require support of LOB locator manipulation by the target database system. In summary, the present method may combine the benefits of batch load operations with overlapping of parallel long-running data transfers while minimizing the merge overhead for combining the independently loaded data partitions.

The present method may thus consider the to-be-moved data volume when the temporary LOB table and the regular table parts need to be merged. The present method may respect the "data gravity", e.g., by moving the smaller fraction of the data to the larger one, which may minimize communication costs in the target database system.

In one example, the data movement of the first and second merging steps may be further optimized by keeping data copy operations between the two target tables node-local. This may be achieved by using the same data distribution key for both tables. That is, the same combination of (regular) table column values are used to distribute rows across all available nodes inside the target database cluster. In this case, the second (LOB) target table may also need the information of the distribution keys. This may be provided by modifying the LOAD process so that it populates the (regular) distribution key columns in both target tables. Alternatively, the corresponding (regular) distribution key columns may be selected from the source table as part of step 307 in addition to the extracted LOB values. They would be transferred twice, once via the UNLOAD/LOAD process in step 305 and once for the LOB copy step 307.

Usually, there are just a few data distribution key columns which are small. Thus, transferring the values twice may not add major overheads. Further, decoupling the regular data copy step 305 from the LOB copy step 307 may avoid any synchronization between these steps and may allow to fully overlap them by parallel executions. If the same distribution key is used for both target tables, the two parts of each row may be assigned to the same target node of the cluster. As consequence, the INSERT operation of the first and second merging steps may be executed on node-local table data. No additional cluster communication overhead may be required if the target database system can consider this.

The present subject matter may comprise the following clauses.

Clause 1. A method for storing a table in a database system, the table comprising a first set of one or more columns and a second set of one or more columns, each column of the first set of columns being configured for comprising first type data, each column of the second set of columns being configured for comprising second type data, wherein the second type data has a maximum size higher than a maximum size of the first type data; the method comprising: allocating a first physical space in the database system, the first physical space comprising a first regular table space, for storing data of the first set of columns and a set of locator columns, the set of locator columns comprising values indicating locations of values of the second set of columns, wherein the set of locator columns have rows that correspond with rows of the first and second set of columns; the first physical space further comprising a first large object table space for storing the second set of columns; allocating a second physical space in the database system, the second physical space comprising a second regular table space, for storing the first set of columns and the locator columns and a second large object table space, for storing the second set of columns; storing the first set of columns and the set of locator columns in the first regular table space, resulting in a first recorded data volume; storing the second set of columns in the second large object table space, resulting in a second recorded data volume; in case the first recorded data volume is higher than or equal to the second recorded data volume: assigning data of the second large object table space to the first large object table space; deallocating the second physical space; in case the first recorded data volume is smaller than the second recorded data volume: assigning data of the first regular table space to the second regular table space; deallocating the first physical space.

Clause 2. The method of clause 1, the database system being a target database system of a data analysis system, the data analysis system comprising a source database system, wherein the table is a source table of the source database system, wherein the method is performed for synchronization of data in the source database system with data in the target database system.

Clause 3. The method of any of the preceding clauses 1 to 2, wherein storing the first set of columns in the first regular table space further comprises storing dummy values representing the second set of columns in the first large object table space.

Clause 4. The method of any of the preceding clauses 1 to 3, wherein storing the second set of columns in the second large object table space further comprises storing dummy values representing the first set of columns and the set of locator columns in the second regular table space.

Clause 5. The method of any of the preceding clauses 1 to 4, wherein the storing of the first set of columns and the set of locator columns and storing of the second set of columns are performed concurrently.

Clause 6. The method of any of the preceding clauses 1 to 5, further comprising determining the first recorded data volume while the data is being stored in the first physical space.

Clause 7. The method of any of the preceding clauses 1 to 6, further comprising determining the second recorded data volume while the data is being stored in the second physical space.

Clause 8. The method of any of the preceding clauses 1 to 7, the database system comprising multiple storage nodes provided as storage spaces, wherein the moving of the data is performed such that each entire row of the table is stored in a same node of the database system.

Clause 9. The method of any of the preceding clauses 1 to 8, further comprising using a same distribution key for performing the moving of the data of the second large object table space and the moving of the data of the first regular table space, the distribution key comprising one or more columns of the first set of columns.

Clause 10. The method of any of the preceding clauses 2 to 9, further comprising: selecting a distribution key from the source table before storing the second set of columns and using the distribution key for performing the moving of the data of the second large object table space and the moving of the data of the first regular table space, the distribution key comprising one or more columns of the first set of columns.

Clause 11. The method of any of the preceding clauses 2 to 10, the second set of columns being referred to herein as large object (LOB) columns, the source database system comprising a source regular table space for storing the first set of columns and the set of locator columns and a source large object table space for storing the second set of columns, the storing of the second set of columns comprising: performing a SELECT statement for selecting all locators in the source regular table space and performing a SELECT statement for selecting all corresponding LOB values of the selected LOB locators, and performing an INSERT statement for storing the selected LOB values.

Clause 12. The method of any of the preceding clauses 1 to 11, the moving of the data of the second large object table space and the moving of the data of the first regular table space being performed using a bulk load operation.

Clause 13. The method of any of the preceding clauses 1 to 12, the table being a partition of a larger table.

Clause 14. The method of any of the preceding clauses 1 to 13, the assigning of the data of the second large object table space to the first large object table space comprising: moving the data of the second large object table space to the first large object table space or swapping the second large object table space with the first large object table space; wherein the assigning of the data of the first regular table space to the second regular table space comprises moving the data of the first regular table space to the second regular table space or swapping the first regular table space with the second regular table space.

Computing environment 800 contains an example of an environment for the execution of at least some of the computer code involved in performing the inventive methods, such as a table storage code 900. In addition to block 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI) device set 823, storage 824, and Internet of Things (IOT) sensor set 825), and network module 815. Remote server 804 includes remote database 830. Public cloud 805 includes gateway 840, cloud orchestration module 841, host physical machine set 842, virtual machine set 843, and container set 844.

Figure 4:
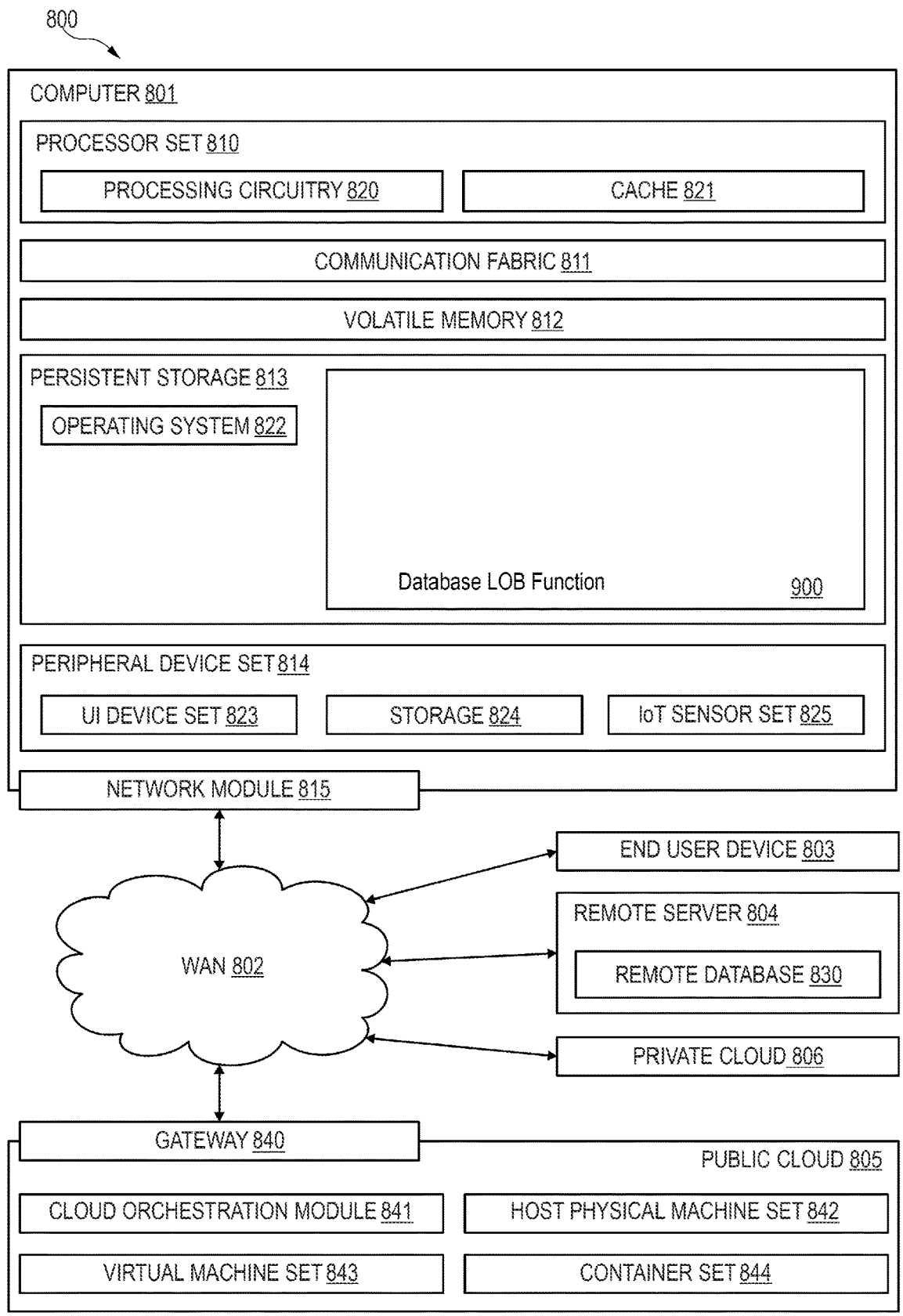
FIG. 4 is a computing environment according to an example of the present subject matter.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 4. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 900 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 900 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

What is claimed is:

1. A method for storing a table in a database system, the table comprising a first set of one or more columns and a second set of one or more columns, each column of the first set of columns being configured for comprising first type data, each column of the second set of columns being configured for comprising second type data, wherein the second type data has a maximum size higher than a maximum size of the first type data; the method comprising:

allocating a first physical space in the database system, the first physical space comprising a first regular table space, for storing data of the first set of columns and a set of locator columns, the set of locator columns comprising values indicating locations of values of the second set of columns, wherein the set of locator columns have rows that correspond with rows of the first and second set of columns; the first physical space further comprising a first large object table space for storing the second set of columns;

allocating a second physical space in the database system, the second physical space comprising a second regular table space, for storing the first set of columns and the locator columns and a second large object table space, for storing the second set of columns;

storing the first set of columns and the set of locator columns in the first regular table space, resulting in a first recorded data volume, wherein the first recorded data volume is a total size of all inserted regular values and locators;

storing the second set of columns in the second large object table space, resulting in a second recorded data volume, wherein the second recorded data volume is a total size of all inserted large object values and locators; and comparing the first recorded data volume to the second recorded data volume; and one of responding to the first recorded data volume being higher than or equal to the second recorded data volume by: assigning data of the second large object table space to the first large object table space, and deallocating the second physical space; and responding to the first recorded data volume being smaller than the second recorded data volume by assigning data of the first regular table space to the second regular table space, and deallocating the first physical space.

2. The method of claim 1, the assigning of the data of the second large object table space to the first large object table space comprising: moving the data of the second large object table space to the first large object table space or swapping the second large object table space with the first large object table space; wherein the assigning of the data of the first regular table space to the second regular table space comprises: moving the data of the first regular table space to the second regular table space or swapping the first regular table space with the second regular table space.

3. The method of claim 1, the database system being a target database system of a data analysis system, the data analysis system comprising a source database system, wherein the table is a source table of the source database system, wherein the method is performed for synchronization of data in the source database system with data in the target database system.

4. The method of claim 1, wherein storing the first set of columns in the first regular table space further comprises storing dummy values representing the second set of columns in the first large object table space.

5. The method of claim 1, wherein storing the second set of columns in the second large object table space further comprises storing dummy values representing the first set of columns and the set of locator columns in the second regular table space.

6. The method of claim 1, wherein the storing of the first set of columns and the set of locator columns and storing of the second set of columns are performed concurrently.

7. The method of claim 1, further comprising determining the first recorded data volume while the data is being stored in the first physical space.

8. The method of claim 1, further comprising determining the second recorded data volume while the data is being stored in the second physical space.

9. The method of claim 1, the database system comprising multiple storage nodes provided as storage spaces, wherein the moving of the data is performed such that each entire row of the table is stored in a same node of the database system.

10. The method of claim 1, further comprising using a same distribution key for performing the moving of the data of the second large object table space and the moving of the data of the first regular table space, the distribution key comprising one or more columns of the first set of columns.

11. The method of claim 3, further comprising: selecting a distribution key from the source table before storing the second set of columns, and using the distribution key for performing the moving of the data of the second large object table space and the moving of the data of the first regular table space, the distribution key comprising one or more columns of the first set of columns.

12. The method of claim 3, the second set of columns being referred to herein as large object (LOB) columns, the source database system comprising a source regular table space for storing the first set of columns and the set of locator columns and a source large object table space for storing the second set of columns, the storing of the second set of columns comprising: performing a SELECT statement for selecting all locators in the source regular table space and performing a SELECT statement for selecting all corresponding LOB values of the selected LOB locators, and performing an INSERT statement for storing the selected LOB values.

13. The method of claim 1, the moving of the data of the second large object table space and the moving of the data of the first regular table space being performed using a bulk load operation.

14. The method of claim 1, the table being a partition of a larger table.

15. A computer program product comprising a computer-readable storage medium having computer-readable program code embodied therewith, the program code executable by a processor of a computer to perform a method, the method comprising:

allocating a first physical space in the database system, the first physical space comprising a first regular table space, for storing data of the first set of columns and a set of locator columns, the set of locator columns comprising values indicating locations of values of the second set of columns, wherein the set of locator columns have rows that correspond with rows of the first and second set of columns; the first physical space further comprising a first large object table space for storing the second set of columns;

allocating a second physical space in the database system, the second physical space comprising a second regular table space, for storing the first set of columns and the locator columns and a second large object table space, for storing the second set of columns;

storing the first set of columns and the set of locator columns in the first regular table space, resulting in a first recorded data volume, wherein the first recorded data volume is a total size of all inserted regular values and locators;

storing the second set of columns in the second large object table space, resulting in a second recorded data volume, wherein the second recorded data volume is a total size of all inserted large object values and locators;

comparing the first recorded data volume to the second recorded data volume; and one of responding to the first recorded data volume being higher than or equal to the second recorded data volume by assigning data of the second large object table space to the first large object table space and deallocating the second physical space, and responding to the first recorded data volume being smaller than the second recorded data volume by assigning data of the first regular table space to the second regular table space and deallocating the first physical space.

16. A database system for storing a table in the database system, the database system including at least one processor, a memory, input/output circuitry, and a network interface, each of the at least one processor, memory, input-output circuitry and the network interface being coupled together by a bus, the memory storing the table and the table comprising a first set of one or more columns and a second set of one or more columns, each column of the first set of columns being configured for comprising first type data, each column of the second set of columns being configured for comprising second type data, wherein the second type data has a maximum size higher than a maximum size of the first type data; the database system being configured for:

allocating a first physical space in the database system, the first physical space comprising a first regular table space, for storing data of the first set of columns and a set of locator columns, the set of locator columns comprising values indicating locations of values of the second set of columns, wherein the set of locator columns have rows that correspond with rows of the first and second set of columns; the first physical space further comprising a first large object table space for storing the second set of columns;

allocating a second physical space in the database system, the second physical space comprising a second regular table space, for storing the first set of columns and the locator columns and a second large object table space, for storing the second set of columns;

storing the first set of columns and the set of locator columns in the first regular table space, resulting in a first recorded data volume, wherein the first recorded data volume is a total size of all inserted regular values and locators;

storing the second set of columns in the second large object table space, resulting in a second recorded data volume, wherein the second recorded data volume is a total size of all inserted large object values and locators;

comparing the first recorded data volume to the second recorded data volume; and one of responding to the first recorded data volume being higher than or equal to the second recorded data volume by assigning data of the second large object table space to the first large object table space and deallocating the second physical space, and responding to the first recorded data volume being smaller than the second recorded data volume by assigning data of the first regular table space to the second regular table space and deallocating the first physical space.

17. The database system of claim 16, being comprised in a data analysis system, the data analysis system comprising a source database system and a target database system which is the database system, wherein the table is a source table of the source database system, wherein the database system is configured for receiving a load request for loading the table in the database system, thereby enabling synchronization of data in the source database system with data in the target database system.

18. The database system of claim 16, being configured for performing the storing of the first set of columns in the first regular table space in addition to storing dummy values representing the second set of columns in the first large object table space.

19. The database system of claim 16, being configured for performing the storing of the second set of columns in the second large object table space in addition to storing dummy values representing the first set of columns and the set of locator columns in the second regular table space.

20. The database system of claim 16, being configured for performing the storing of the first set of columns and the set of locator columns and storing of the second set of columns are performed concurrently.

21. The database system of claim 16, being configured for determining the first recorded data volume while the data is being stored in the first physical space.

22. The database system of claim 16, being configured for determining the second recorded data volume while the data is being stored in the second physical space.

23. The database system of claim 16, the database system comprising multiple storage nodes provided as storage spaces, wherein the moving of the data is performed such that each entire row of the table is stored in a same node of the database system.

24. The database system of claim 16, being configured for using a same distribution key for performing the moving of the data of the second large object table space and the moving of the data of the first regular table space, the distribution key comprising one or more columns of the first set of columns.

25. The database system of claim 17, being configured for selecting a distribution key from the source table before storing the second set of columns and using the distribution key for performing the moving of the data of the second large object table space and the moving of the data of the first regular table space, the distribution key comprising one or more columns of the first set of columns.

* * * * *